Oct. 28, 1930.  A. J. KAUFFMAN  1,779,475
CHANGEABLE EXHIBITOR
Filed Oct. 8, 1927  3 Sheets-Sheet 1
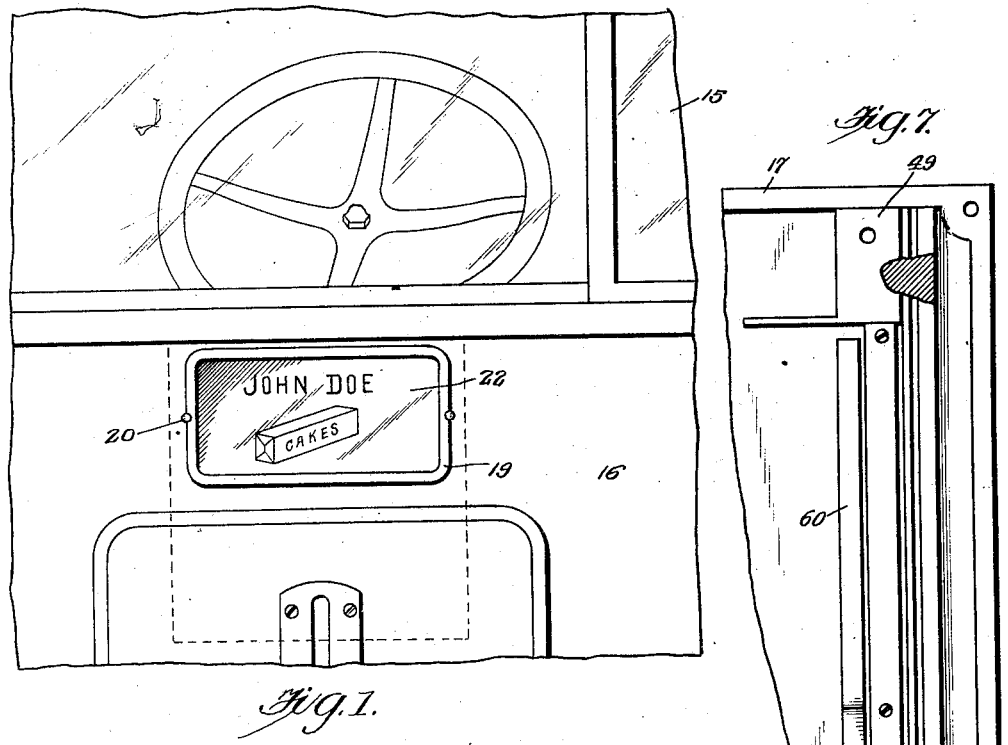
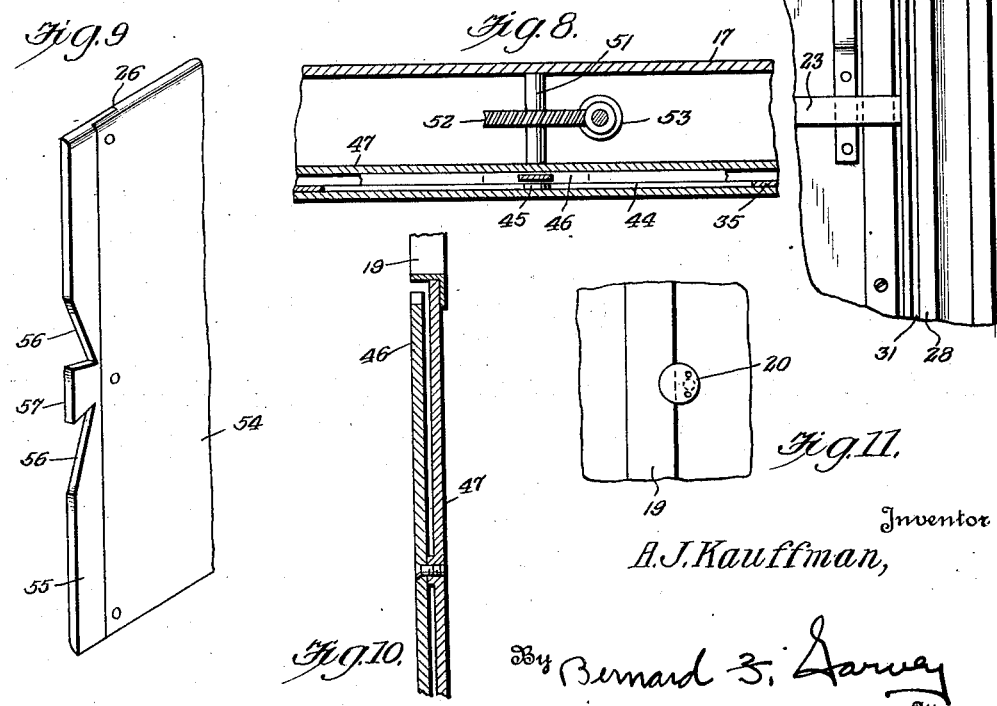

Oct. 28, 1930.  A. J. KAUFFMAN  1,779,475
CHANGEABLE EXHIBITOR
Filed Oct. 8, 1927   3 Sheets-Sheet 2
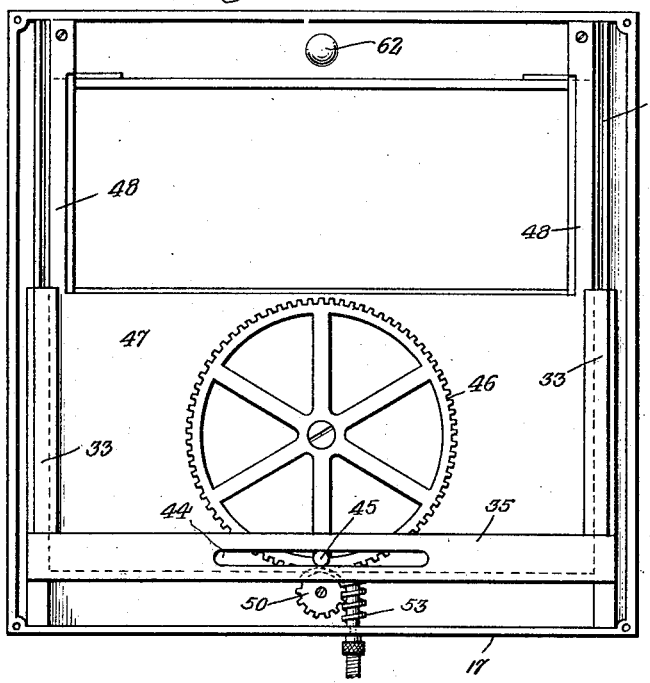
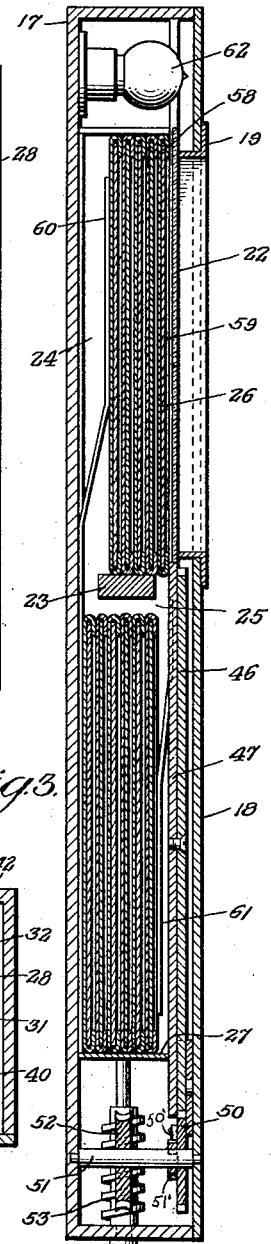
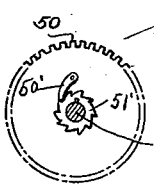
Inventor
A. J. Kauffman,
By Bernard F. Garvey
Attorney Oct. 28, 1930.　　　A. J. KAUFFMAN　　　1,779,475
CHANGEABLE EXHIBITOR
Filed Oct. 8, 1927　　　3 Sheets-Sheet 3
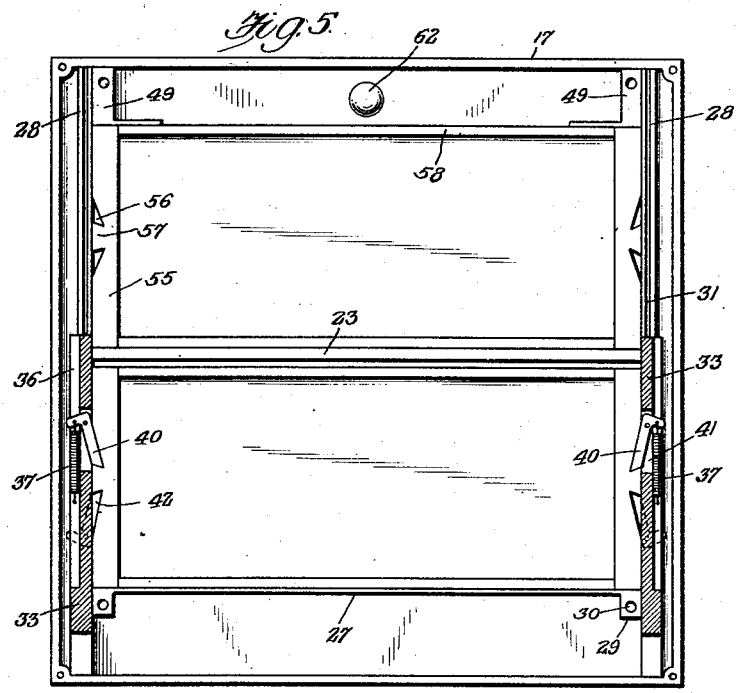
Inventor
A. J. Kauffman,
By Bernard F. Garvey
Attorney Patented Oct. 28, 1930

1,779,475

UNITED STATES PATENT OFFICE

ALBERT J. KAUFFMAN, OF JOHNSTOWN, PENNSYLVANIA

CHANGEABLE EXHIBITOR

Application filed October 8, 1927. Serial No. 224,856.

The present invention consists of a changeable exhibitor which is especially adapted for use on public vehicles, such as taxi-cabs, to conspicuously display advertising matter in the path of vision of the cab occupants, the advertising matter being automatically changed at predetermined intervals during the course of travel of the vehicle.

It is well-known in the art to equip vehicles with changeable exhibitors and to automatically operate the exhibitors from a moving part of the vehicle but the present invention additionally contemplates the use of a compact mechanism which is concealed preferably behind the front seat of the vehicle and has a portion only thereof discernible through the wall of the vehicle for displaying the advertising matter in a position where it can be conveniently read by the occupants of the vehicle, the device being of unusually compact structure and durable so as to be unaffected by the vibration of the vehicle and eliminating the necessity of adjustment or attention.

Another object of the invention is to provide novel mechanism for actuating indicia-carrying plates, forming a part of this invention, which not only effectively operates the plates but likewise provides mechanism which operates with facility to selectively move the plates at predetermined intervals to provide changeable reading matter for the occupants of the vehicle.

Other objects of the invention will be apparent from the following description of the present preferred form of the invention, taken in connection with the accompanying drawings, where:—

Figure 1 is a front elevational view of an exhibitor constructed in accordance with the present invention, illustrating the application of the same to a vehicle, the latter being fragmentarily shown.

Figure 2 is a front elevational view of the exhibitor per se, with the front plate of the casing and transparent panel removed and illustrating to advantage the mechanism for operating the plate-actuating carriage.

Figure 3 is a vertical sectional view of the complete exhibitor.

Figure 4 is a detail fragmentary transverse sectional view of the same.

Figure 5 is a front elevational view of the exhibitor showing the front plate and carriage operating mechanism removed, the carriage being shown in section to disclose details.

Figure 6 is a detail fragmentary vertical sectional view of the exhibitor showing the carriage in end elevation.

Figure 7 is a detail enlarged fragmentary front elevational view illustrating to advantage one of the tracks and one of the plate urging springs.

Figure 8 is a detail enlarged fragmentary transverse sectional view of the exhibitor illustrating the manner of mounting the pinion and worm gear in the bottom of the casing.

Figure 9 is a detail enlarged fragmentary perspective view of one of the advertising indicia carrying plates looking at the back of the latter.

Figure 10 is a detail enlarged fragmentary vertical sectional view of the carriage operating spur gear wheel showing to advantage the manner of mounting the same.

Figure 11 is a detail enlarged fragmentary front elevational view illustrating the manner of securing the opening frame to the front wall of the casing.

Figure 12 is a detail enlarged fragmentary perspective view of the carriage used in the present invention;

Figure 13 is a similar view of one of the tracks and lower plate-engaging sill; and, Figure 14 is a detail sectional view taken through the operating shaft and showing the manner of mounting the gear and ratchet wheel thereon.

In order to illustrate the application of the invention, a portion of a vehicle 15 is shown, which may consist of a taxi-cab of usual construction, embodying a partition or front wall 16 which separates the driver's seat from the occupant receiving part of the vehicle. An opening is provided in the partition or wall 16, directly in back of the driver's seat, through which the advertising matter will be displayed in accordance with the teaching of the present invention as hereinafter set forth.

The device of the present invention consists of a casing 17, as shown to advantage in Figure 3, which is relatively flat and is of rectangular configuration. The casing may be made of aluminum or other desirable material and is provided with a removable outer plate 18, which is attached by screw or other detachable securing means to the casing. The front plate 18 is provided with an opening therein which receives a frame 19, the latter being detachably engaged with the casing by suitable securing means as illustrated at 20. A portion of the frame projects inwardly beyond the inner face of the plate 18 to provide a clamping rim 21, which impinges against the outer face of a transparent panel 22, which latter extends completely across the opening in the front plate 18 of the casing.

The casing is divided by a partition 23 into upper and lower compartments 24 and 25 respectively, which are adapted for the reception of advertising indicia carrying plates, generally designated 26. The lower compartment 25 is provided with a plate-receiving sill 27 which supports the plates in the lower compartment, the sill being held in spaced relation to the bottom of the casing by engaging the ends thereof with tracks 28, one of which is mounted in each side of the casing. The ends of the sill 27 are enlarged to provide bearing blocks 29 each of which has a screw-threaded socket 30 formed therein for a purpose herinafter described.

Each of the tracks 28 has the terminals thereof secured to the opposite ends of the casing, and as illustrated to advantage in Figure 5, are appreciably spaced from the side walls of the casing. The longitudinal edges of each track has grooves 31 formed therein which are adapted for the reception of complemental tongues 32 formed on the runners 33 of a carriage generally designated 34. The carriage 34 in addition to including a pair of runners, which complement the tracks 28 and are slidably engaged with the latter, also includes a cross bar 35 which extends from one runner to the other, transversely across the casing, and is preferably formed integral therewith as shown to advantage in Figure 12. The cross bar 35 is engaged with the runners near the lower ends of the latter while portions on the outer walls of the runners above the cross bars 35 are rabbeted to provide longitudinally extending outer and inner grooves 36 and 36' respectively, in which coil springs 37 and 37' are operatively mounted. Each of the coil springs 37 has one end anchored to the runner 33, as indicated at 38, at a point below the center of the runner while the springs 37' are anchored to the runner 33, as indicated at 39, at a point above the center of the runner. The opposite end of each of the springs 37 is engaged with one end of a bell crank lever 40 which is pivotally mounted in an opening 41 formed in the carriage 34 while the opposite end of each of the springs 37' is engaged with one end of a bell crank lever 42 which latter is pivotally mounted in an opening 43 formed in the carriage. The free ends of the bell crank levers 40 and 42 are urged inwardly beyond the inner faces of the runners 33 by the coil springs as illustrated to advantage in Figure 5.

The cross bar 35 of the carriage is provided with a longitudinally extending slot 44 in which a bearing or stud 45 is movably mounted. The bearing 45 is excentrically carried on one face of a spur gear wheel 46 which latter is detachably and rotatably mounted upon a bearing plate 47. The lower end of the bearing plate 47 is detachably engaged with the bearing blocks 29 of the sill 27, while the upper end of the plate has guide strips 48 extended therefrom which are detachably engaged with bearing blocks 49, the latter being mounted in the upper end of the casing 17 between the tracks 28. The spur gear wheel 46 is rotated through the medium of a complemental gear 50 which is loosely mounted on a shaft 51 to permit rotation of the latter independently of the gear. The shaft has its opposite ends journaled in the casing. The gear 50 is equipped with a pawl 50' which is adapted to co-act with a ratchet wheel 51', the latter being keyed to the shaft 51 in close proximity to the gear 50. Consequently, when the shaft rotates in one direction, the pawl 50' locks with the rachet wheel 51' to rotate the wheel 46. When the shaft rotates in the opposite direction the gear 50 is inoperative. In this way the indicia bearing plates 26 are operated only when the vehicle moves forwardly. The shaft 51 is rotated through the medium of a pinion 52 which is secured to the shaft and engages in mesh with a worm shaft 53, the lower end of which latter extends through the bottom of the casing and is adapted for operative connection with some movable part of the vehicle. Rotation of the gear wheel 46 causes movement of the carriage 34 to continuously elevate and lower the carriage during the forward movement of the vehicle to correspondingly move the plates 26.

Each of the plates 26 consists of a metallic housing 54, the opposite ends of which are equipped with bars 55 made of metal or other suitable material, each of which is provided with recesses 56 in the outer margins thereof, approximately midway the ends of the bar. The recesses 56 in each bar are formed by removing portions of the bar to provide inclined faces, the inner ends of which terminate in an abutment 57. The upper and lower marginal edges of each of the housings 54 is folded over to provide parallelly extending guides 58 which are adapted to receive therein the marginal edges of an advertising indicia carrying placard 59. The placards 59 may be made of pasteboard or like material which is sufficiently flexible to permit the marginal edges thereof to be sprung beneath the flanges of the guides 58. The placards may be readily removed from their housings by inserting an instrument beneath an end of the placard and urging the latter outwardly from the housing to disengage the marginal edges of the placard from the guides 58. This permits of expeditious replacement of the advertising placards.

As illustrated to advantage in Figure 3, the present form of the invention is adapted to carry five (5) plates in the upper compartment 24, and six (6) plates in the lower compartment 25. The plates in the upper compartment are urged into engagement with the bearing plate 47 and the guide strips 48 of the bearing plate by flat springs 60. A pair of springs is employed, the lower end of each of which is fixedly secured to the rear wall of the housing while the free end of the spring impinges against the back of the innermost plate as shown to advantage in Figure 3. An intermediate part of the spring between that portion which bears against the plate and the inner end thereof which is secured to the casing, is obliquely disposed to form a guide for the ascending plate which is urged upwardly by the upward movement of the carriage 34. The plates in the lower compartment are urged against the rear wall of the casing by flat springs 61, a pair of the latter being mounted upon the inner face of the bearing plate 47, one end of each spring being secured to the bearing plate and the opposite end engaged with the outermost plate having the intermediate portion of the spring obliquely disposed to form a guide for the descending plate when the carriage 34 is moved downwardly in a manner hereinafter described.

Assuming that the plates are in the position shown in Figure 3 of the drawings and the carriage 34 is in its lowermost position, the bell crank levers 42 of the carriage will be engaged in the lower recesses 56 of the innermost plate impinging against the abutments 57. As the carriage moves upwardly, the innermost plate will be caused to ascend by reason of the engagement of the levers 42 with the abutments 57. The plate, in ascending, contacts with the springs 60 and flexes the latter toward the rear wall of the casing, while the springs 61 urge the plates in the lower compartment rearwardly. When the carriage reaches its uppermost position, the levers 40 automatically spring into the upper recesses 56 above the abutments 57 of the outermost plate, which has been on display across the transparent panel 22. As the carriage descends the outermost plate is urged downwardly by reason of the levers 40 impinging against the abutments 57 and as this plate descends, the adjacent plate in the upper compartment is fed outwardly toward the transparent panel 22 by the expansive action of the springs 60. The plates continue to ascend and descend so long as the gear wheel 46 is rotated. The gear wheel 46 is relatively large in proportion to the pinion which enmeshes therewith, so as to retain a plate on display back of the transparent panel 22 a sufficient length of time to permit the entire contents of the advertising placard to be read by the occupant of the vehicle. The placards may be changed from time to time in the manner already set out by simply rotating the securing means 20, shown to advantage in Figure 4, and removing the frame 19 and transparent panel 22.

In order that the advertising matter will be discernible at night, an electric light bulb 62 is mounted in the top of the casing, above the compartment 24, so that the light rays will be projected downwardly on the plates in the upper compartment.

It has been found in actual use, that the carriage 34 provides a positive means for actuating the plates in order to selectively display the same intermittently back of the transparent panel 22. There is no danger of displacement of any of the operating mechanism constructed in accordance with the present invention and the device will operate for an indefinite period of time without any attention or adjustment.

It is, of course, to be understood that I have herein shown and described only a single form of my invention and I am aware that various changes may be made therein especially in the details of construction, proportion and arrangement of the parts without departing from the spirit and scope of the claims hereto appended.

What is claimed is:—

1. A changeable exhibitor including a pair of compartments, each of which is equipped with a plurality of indicia bearing plates, the ends of which are provided with recesses, and a carriage slidably mounted across said compartments and equipped with yieldable elements engageable in the recesses of said plates to transfer said plates from one compartment to another.

2. A changeable exhibitor including a casing divided into compartments, one of which is provided with an opening, plates mounted in each of said compartments and transferable from one compartment to the other to selectively display the latter through the casing opening, grooved tracks mounted in said casing, and a carriage engageable with said plates and equipped with tongues slidable in the grooves of said tracks whereby movement of said carriage on the tracks effects transfer of the plates from one compartment to the other.

3. The combination with a motor vehicle having an opening in a wall thereof communicating with the interior of the vehicle, a changeable exhibitor mounted between the walls of the vehicle and provided with an opening complementing the wall opening of the vehicle, said exhibitor including indicia bearing plates in operative connection with a movable part of the vehicle for selective movement across said opening while the vehicle is in motion.

4. A changeable exhibitor for motor vehicles in combination, a casing divided into compartments and equipped with indicia bearing plates, tracks arranged in the casing at the opposite ends of said plates, a carriage interfitting said tracks and slidable thereon, and yieldable plate engaging elements mounted on the carriage and co-acting with the plate terminals to transfer the plates from one compartment to the other upon movement of the carriage.

ALBERT J. KAUFFMAN.